United States Patent [19]
Keith et al.

[11] 3,772,646

[45] Nov. 13, 1973

[54] VEHICLE ANTI-THEFT TILT ALARM SYSTEM

[75] Inventors: Ernest A. Keith; David E. Keith, both of Cleveland, Ohio

[73] Assignee: Corp. (Ltd.), Cleveland, Ohio

[22] Filed: June 20, 1972

[21] Appl. No.: 264,584

[52] U.S. Cl............... 340/65, 340/52 H, 200/61.52
[51] Int. Cl. ............................................ B60r 25/10
[58] Field of Search..................... 340/52 H, 63, 65; 200/61.45, 61.52

[56] References Cited
UNITED STATES PATENTS

| | | | |
|---|---|---|---|
| 3,562,706 | 2/1971 | Mason | 340/65 |
| 3,671,933 | 6/1972 | Barnes | 340/52 H |

*Primary Examiner*—Alvin H. Waring
*Attorney*—Hamilton, Renner & Kenner

[57] ABSTRACT

Disclosed is an apparatus for detecting changes in the inclination of a vehicle at rest including a suitable alarm which is activated by a sensing mechanism when a change in the inclination of the vehicle is detected. The sensing mechanism has a reference axis which tends to seek a vertical disposition. A mounting assembly pivotally carries the sensing mechanism and is acted upon by a selectively energized control mechanism to enable the sensing mechanism to seek a vertical disposition regardless of the inclination of the parked vehicle. Both the alarm and the control mechanism can be energized by an independent power source or, if desired, the power source of the vehicle can be utilized for that purpose.

10 Claims, 8 Drawing Figures

PATENTED NOV 13 1973 3,772,646

VEHICLE ANTI-THEFT TILT ALARM SYSTEM

BACKGROUND OF THE INVENTION

The invention relates to an alarm apparatus for vehicles and more particularly to an apparatus for the detection of changes in the inclination of a parked vehicle.

Over the past decade vehicle owners have experienced an unprecedented increase in the incident of stolen vehicles, the removal of equipment from vehicles, and the removal of the contents of the vehicle. While the owner is constantly admonished never to leave his keys and also to lock the vehicle, both of these precautions are easily overcome by intruders. Automobile manufacturers have provided an ignition switch which also locks the steering system to prevent the vehicle from being driven away, but this device is no defense against unauthorized entry into the vehicle for the removal of items therefrom.

To afford protection against theft from the car, several devices are on the market which activate an alarm, such as a siren or horn, in response to the unauthorized opening of the trunk, hood, or doors of the vehicle. To circumvent these devices, thieves now commonly tow the desired vehicle to another location where it may be more discreetly and thoroughly stripped. Nor will these devices prevent on-the-spot removal of the tires and wheels from a vehicle which have also a considerable amount of appeal and value to the thief.

The prior art is not without devices for activating an alarm when a portion of the vehicle is raised for the removal of a tire or to be towed away. Exemplary prior art is typified by U.S. Pat. Nos. 2,334,316, issued Nov. 16, 1943 and 2,369,977, issued Feb. 20, 1945. Both devices utilized a type of pendulously moving switch to activate an alarm in response to movement of the vehicle. From the description of the operation of these devices, it appears that they were too rudimentary to have any merit, even if they were commercially available today. To be operative, the devices had to be manually set each time the owner left his vehicle. While the manipulations may have only required several seconds, one need only reflect for a moment upon the reluctance of today's driver to fasten a safety belt or lock his doors before realizing that the average driver usually prefers not to spend any extra time in leaving his vehicle. Moreover, these devices had to be visible to be set and were therefore expediently mounted directly on the instrument panel where they could be readily discovered and disabled. What is required is an alarm device capable of preventing tire removal or towing of the vehicle which is set with a minimum amount of effort and yet is not likely to be disabled by the thief.

SUMMARY OF THE INVENTION

An object of the invention is to provide an apparatus which can detect changes in the inclination of a vehicle at rest and activate an alarm in response thereto.

Another object of the present invention is to provide an apparatus to activate an alarm whenever one or more of the wheels of the vehicle are lifted from the ground in an attempt to remove the tires or to tow the vehicle.

A further object of the present invention is to provide an apparatus which may be automatically set for the detection of changes in the inclination of a vehicle irrespective of the slope of the land on which the vehicle rests.

Still another object of the present invention is to provide an apparatus which may not be intentionally deactivated by cutting the battery cables of the vehicle.

A still further object of the present invention is to provide an apparatus which complements existing alarm devices to afford the owner the most complete protection against theft.

In general, the invention relates to an apparatus for detecting changes in the inclination of a vehicle which is at rest. The apparatus has an alarm means which is activated by movement of the vehicle from its plane of rest. A sensing mechanism maintains an open circuit to the alarm means which closes upon changes in the inclination of the vehicle in any direction. The sensing mechanism is pivotally carried within the apparatus by a mounting assembly, and a control means thereon is selectively energized to engage the mounting assembly. When the control means is energized the mounting assembly permits the sensing means to immediately seek a vertical plane of reference with respect to that of the vehicle, the circuit to the alarm means still being open. De-energization of the control means maintains the sensing mechanism in this position whereby subsequent movement of the vehicle will cause the circuit to close. A separate power source is provided to energize both the alarm and the control means.

DESCRIPTION OF THE DRAWINGS

In FIG. 4 the apparatus is in a ready or open circuit position and in FIG. 5 the apparatus is in an activating or closed circuit position;

In FIG. 6 the apparatus is in a ready or open circuit position and in FIG. 7 the apparatus is in an activating or closed circuit position; and, FIG. 8 is a schematic view of the electrical system of the apparatus.

DESCRIPTION OF THE PREFERRED EMBODIMENT

Figure 1:
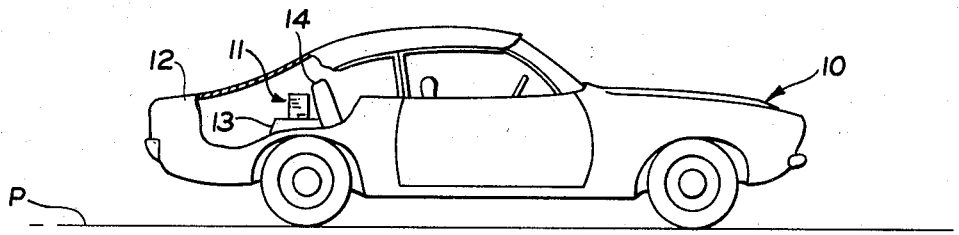
FIG. 1 is a side elevation of a vehicle parked upon a horizontal plane of reference and partially in section showing a location of the apparatus.

Referring more particularly to the drawings, a vehicle 10 is shown parked on a surface or plane of reference designated "P" in FIG. 1. It is to be understood that although an automobile is represented, the apparatus is equally suited for other types of vehicles whether self-powered or not, as in the case of trucks, trailers and the like. The vehicle 10 could also be parked upon a laterally sloped surface, or upon one which is generally uphill or downhill, as well as the horizontal surface. A vehicle alarm apparatus, indicated generally by the numeral 11, is shown mounted within the truck 12 of the vehicle upon a shelf 13 and against the back of the rear seat 14. Of course, the apparatus 11 may be mounted anywhere within the vehicle 10, although it is preferable to choose a location inaccessible to intruders as well as out of immediate view.

Figure 2:
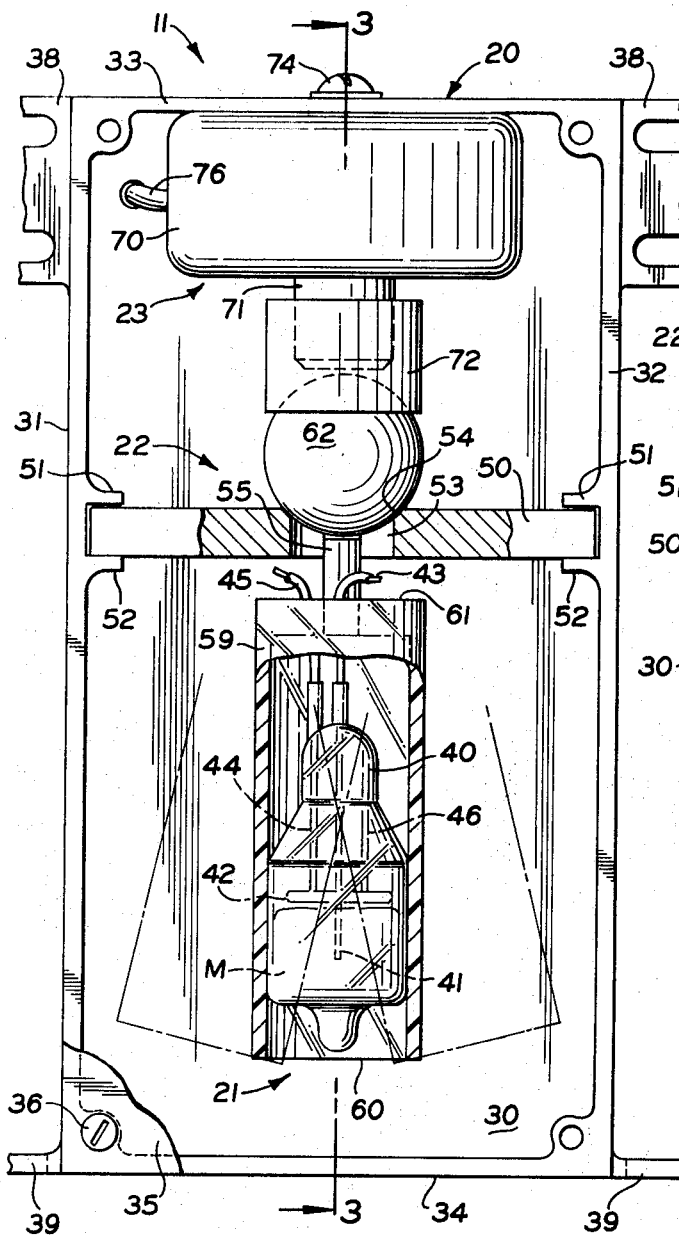
FIG. 2 is a front plan view of the apparatus with the front cover broken away and partially in section.
Figure 3:
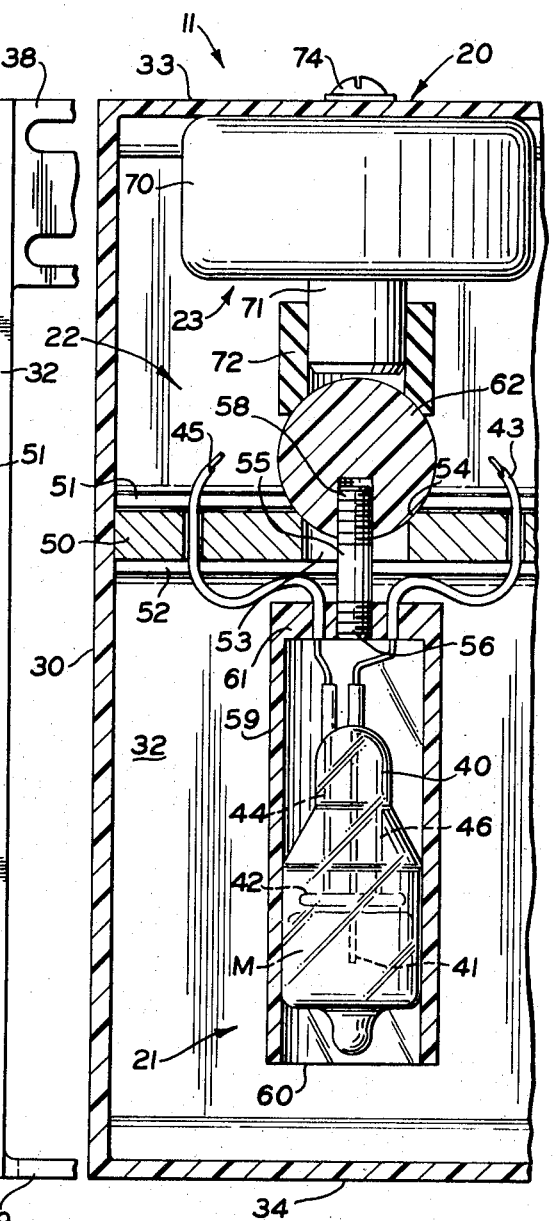
FIG. 3 is a vertical sectional view of the apparatus taken substantially along line 3—3 of FIG. 1.

The apparatus 11 is shown in detail in FIG. 2 as having an exterior housing, referred to generally by the numeral 20, which is manufactured from plastic or other suitable material. The apparatus 11 contains a sensing device indicated generally by the numeral 21, a mounting assembly indicated generally by the numeral 22, pivotally carrying the sensing device 21, and a control means indicated generally by the numeral 23. The apparatus is provided with an independent energizing source 24 and a suitable alarm 25, shown in FIG. 8 to be hereinafter described.

The housing 20 has a rear wall 30, with left and right lateral walls, 31 and 32, respectively, and top and bottom walls, 33 and 34, respectively, formed integrally therewith. A removable front cover 35, partially broken away in FIG. 1 to show the interior of apparatus 11, is conveniently fastened to housing 20 via screws 36. The housing 20 may be provided with brackets 38 and 39 to facilitate mounting or it may be bolted directly to the vehicle by drilling holes through any of the walls 30–34.

The sensing mechanism 21, can include a special type of mercury tube 40 which is designed to be operable in a vertical position. The tube 40 contains a sufficient amount of mercury to enable a reference axis, the central axis of the tube 40, to always seek a true vertical disposition. It has been found that conventional mercury tubes, commercially available, have an insufficient amount of mercury therein and are therefore incapable of performing satisfactorily in the apparatus 11. In conventional tubes the mercury closes the circuit when the tube is moved to a position approximately horizontal, while for the present apparatus to be functional, the curcuit must be closed whenever the tube is moved more than three degrees from true vertical in any direction. Therefore, the tube 40 must be so designed to maintain an open circuit when vertically disposed until moved through an angle of at least 3° to close the circuit. A change of at least three degrees in the inclination of the vehicle will therefore activate the alarm 25, before any of the wheels are removed from the plane of reference "P."

An axially extending wire 41 passes through the central axis of the tube 40 and is immersed in the mercury M. An annular contact ring 42 within tube 40 is positioned immediately above the meniscus of the mercury M, so as not to contact the mercury M until the tube is tilted at least 3°. A lead wire 43 passes from the axially extending wire 41 to the energizing source 24, and a contact wire 44 passes from the contact ring 42 to the outside of tube 40 and is connected to another lead wire 45 from the energizing source 24. An additional wire 46, opposite the contact wire 44, supports the ring 42.

Tube 40 of sensing mechanism 21 is carried by mounting assembly 22 which includes a removable plate 50, held between lateral walls 31 and 32 of housing 20 and having the same dimensions as the top and bottom walls 33 and 34 thereof. The walls 31 and 32 may be manufactured with upper and lower flanges, 51 and 52, respectively, between which plate 50 is carried. The center of plate 50 has a bore 53 with a tapered seat 54 for the passage of a rod 55 therethrough having threaded ends 56 and 58.

The tube 40 is mounted within a cylindrical shell 59 having an open and closed end, 60 and 61, respectively. The shell 59 is preferably manufactured from a clear plastic and has an inside diameter which frictionally engages the tube 40. The end 61 is tapped to threadably engage rod 55 at 56, and holes are drilled therethrough for the passage of contact wires 43 and 45 which pass through rear wall 30 to the power source 24. A ball 62, of plastic or other suitable material threadably engages the opposite end 58 of rod 55.

To mount the tube 40 within apparatus 11, it is first positioned within shell 59 which in turn is threaded onto rod end 56. Rod 55 is then passed through the bore 53 in the plate 50 and threaded into the ball 62. The bore 53 has a diameter less than that of the ball 62 so that the latter is maintained above plate 50 while the shell 59 and tube 40 are carried therebelow. The seat 54 of bore 53 corresponds to the circumference of the ball 62 to enable the latter to rotate freely thereon. The plate 50 is then slid into the housing 20 between flanges 51 and 52.

As best seen in FIG. 2, when the tube 40 is properly mounted within apparatus 11, the rod 55 is of a sufficient length to permit the shell 59 to pivot in any direction without interference with plate 50. Likewise, the bore 53 is of a sufficient diameter to permit the shell 59 to swing at least 3° in any direction from its normal vertical position. So long as the ball 62 is able to rotate freely within seat 54 the weight of the mercury will insure that the tube 40 will return to a true vertical position. Movement of the tube 40 and shell 59 is depicted by chain lines in FIG. 2.

Movement of the mounting assembly 22 and thus tube 40 is regulated by the control means 23 which can consist of a solenoid 70 having a plunger 71 which carries a rubber cap 72 at one end. The solenoid 70 is fastened to the top wall of housing 20 by a screw 74. The plunger 71 is normally extended from the solenoid 70 by means of an internal compression spring (not shown) and in this position the cap 72 engages the ball 62 prohibiting any movement thereof. Upon energization of solenoid 70, the plunger 71 is retracted from ball 72 permitting its movement as well as the vial 59 and mercury tube 40.

Figure 8:
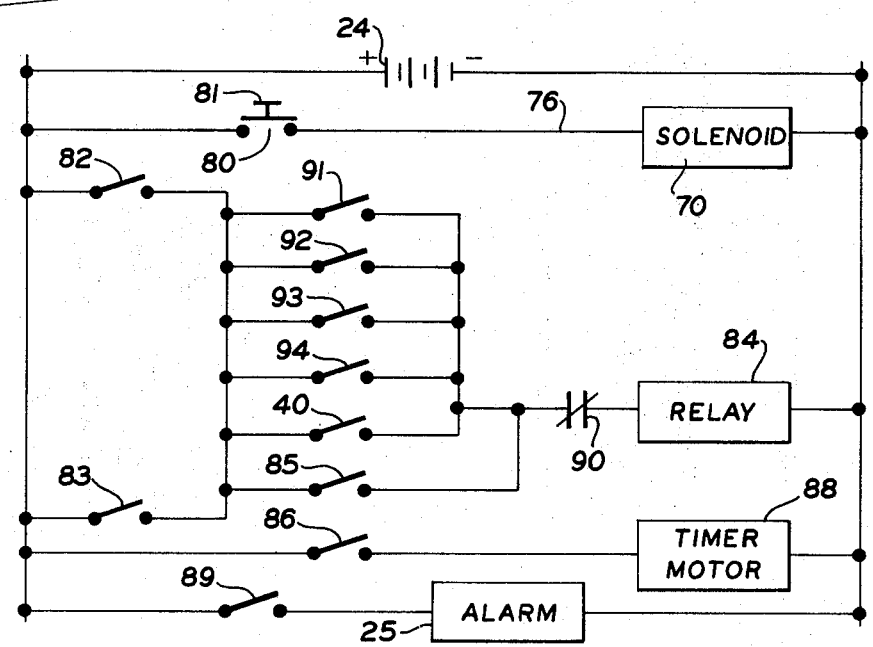

Referring to FIG. 8, as previously described the apparatus 11 is provided with an energizing source which can be a battery 24 to power the control means 23 and the alarm 25. While the apparatus 11 may be operated by the regulator storage battery of the vehicle, it is not uncommon for the car thief to cut the battery cables from underneath the vehicle in an attempt to deactivate any alarm devices. By providing an independent power supply, inaccessible to the car thief, this problem is obviated. It is also preferable to mount the alarm 25 high on the firewall of the vehicle 10, passing the wires thereto through the inside of the vehicle 10, minimizing accessibility to the wires and the alarm 24.

Figure 4:
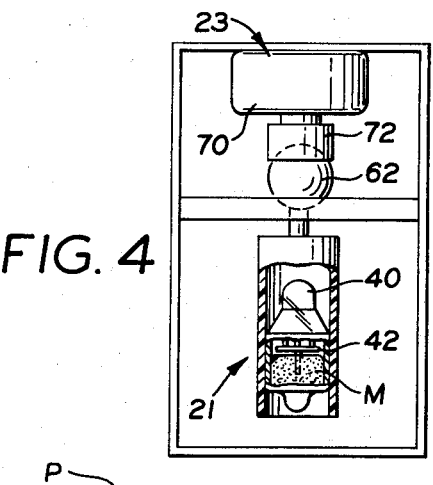
FIGS. 4 and 5 depict the apparatus with respect to a horizontal plane of reference.
Figure 6:
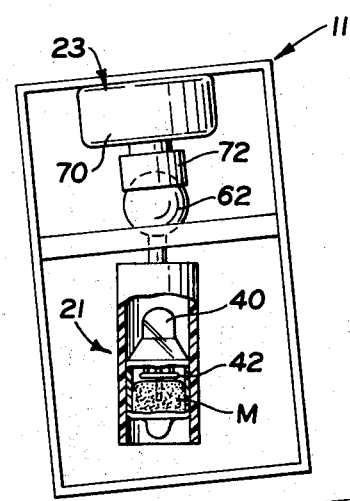
FIG. 6 and 7 depict the apparatus with respect to an inclined plane of reference.
Figure 7:
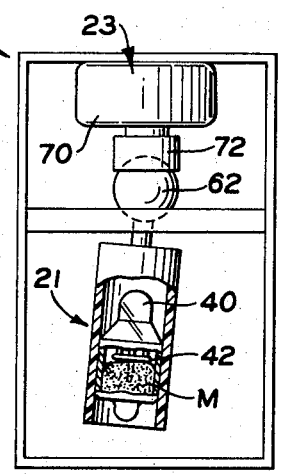

The solenoid 70 is connected to the power source 24 via a wire 76 (FIGS. 2 and 8) which is also led through the rear wall 30. A switch 80, having a push button 81, is mounted inside of the vehicle 10 to control the solenoid 70. When the vehicle is parked, momentary depression of button 81 activates the solenoid which retracts the plunger 71, freeing the ball 62. Whether the vehicle 10 rests upon a horizontal plane P, or any inclined plane for example P1 as shown in FIGS. 6 and 7, the apparatus 11 may be set. Referring to FIGS. 4 and 6 when the ball 62 is freed, the mercury tube 40 quickly moves to a true vertical position where none of the mercury M therein touches contact ring 42, creating an open circuit. Release of button 81 deactivates the solenoid 70 and spring 75 urges the plunger 71 and cap 72 against ball 62, restricting its movement within seat 54.

Figure 5:
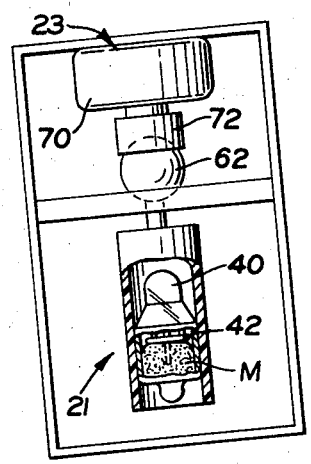

The entire alarm system may now be set by closing switches 82 and 83 mounted in parallel (FIG. 8) which are normally left open while the vehicle is being used. Although one switch 82 will suffice, as an extra precaution a second switch 83, mounted in an inconspicuous location preserves the integrity of the system in the event that switch 82 is discovered and disabled. Referring to FIGS. 5 and 7, subsequent movement of the vehicle 10 will result in a change of inclination of the apparatus 11. Whether the vehicle 10 had rested upon a horizontal plane P, or an inclined plane P1, the mercury M within tube 40 will flow therein and touch contact ring 42 allowing the current to pass therethrough.

Referring again to FIG. 8, when current passes through mercury tube 40 (shown as a switch) it activates a relay 84 which closes a "lock-in" contact switch 85, a second contact switch 86 to activate a timer motor 88, and a third contact switch 89 to the alarm 25. Although the timer motor 88 is not required for the operation of apparatus 11, it is preferably incorporated in the system. Usually upon activation of the alarm 25 tampering with the vehicle 10 ceases and the would-be thief is frightened off; however, the alarm 25 continues until the owner returns to the vehicle. The timer motor 88 may be set to deactivate the alarm after a predetermined period such as 30 seconds, by mechanically breaking the circuit through a normally closed timer contact 90 which is wired in series with relay 84. Lack of current to relay 84 causes switches 85, 86 and 89 to open. After an interval of several seconds the timer motor 88 resets, and if current is still able to flow through mercury tube 40 the alarm cycle is repeated until the tampering ceases and the vehicle is restored to its parked position.

To preclude other types of tampering, such as intrusions into the vehicle, the system may also be provided with a hood switch 91, door switches 92 and 93, and a trunk switch 94, or it may be used in conjunction with an existing system which has such switches. Upon opening any door, the hood or the trunk, the alarm 25 will be activated as if the mercury tube had closed the circuit. The purpose of the lock-in switch 85 is to keep the alarm 25 activated through at least one cycle even if the tampering ceases as soon as the alarm is set off. This will insure that the thief is quickly frightened away from the vehicle 10. Thus, even if the door, hood or trunk is immediately closed, or the vehicle 10 is immediately lowered, the alarm 25 will remain activated through at least one cycle of the timer motor and contact, 84 and 90, respectively.

It would also be possible to utilize an electronic device such as a minature transmitter (not shown) to activate the solenoid 70 and to set the alarm system. Such a device could be easily carried by the owner and would eliminate the need to operate switches 81, 82 and 83 as well as the risk that each may be discovered and disabled.

Because the apparatus 11 detects changes in the inclination of a parked vehicle 10 it is activated not only by attempting to lift up part of the vehicle 10 but also by an attempt to drive it away. Thus even if the vehicle is left unlocked and is subsequently stolen, as soon as it passes over an inclination different from that upon which it was left, the mercury M will touch contact ring 42, closing the circuit and activating the alarm 25.

From the foregoing description it should be apparent to one skilled in the art that the apparatus disclosed herein provides a reliable alarm system to aid in the prevention of vehicle theft or the removal of equipment therefrom.

We claim:

1. Apparatus for detecting changes in the inclination of a vehicle at rest comprising; alarm means, sensing means for detecting changes in the inclination of said vehicle and activating said alarm means, mounting means carrying said sensing means, control means selectively energized to act upon said mounting means to enable said sensing means to seek a vertical plane of reference irrespective of any plane upon which the vehicle may rest, and means to energize said alarm means and said control means.

2. An apparatus, as in claim 1, wherein said sensing means comprises; a tube having a quantity of mercury therein, a first electrical contact extending into said mercury and a second electrical contact positioned immediately above said mercury so that upon a change in the inclination of said tube, said mercury will contact said second electrical contact.

3. An apparatus, as in claim 1, wherein said mounting means conprises; a shell carrying said sensing means, a rod threadably engaging said shell, a plate having a bore therethrough for the passage of said rod, and a ball having a greater diameter than said bore and threadably engaging said rod.

4. An apparatus, as in claim 1, wherein said control means comprises; a solenoid having a plunger, and a cap carried by the end of said plunger to engage a portion of said mounting means and thereby restrict movement of said sensing means.

5. An apparatus, as in claim 1, wherein said means for energizing said alarm means and said control means is a battery.

6. An apparatus, as in claim 1, wherein said alarm means is activated in response to a change in the inclination of the sensing means of at least 3° from its vertical disposition.

7. An apparatus, as in claim 1, wherein said alarm means is a battery operated siren.

8. An apparatus, as in claim 1, wherein a timer means deactivates and reactivates said alarm means at intervals of predetermined selection.

9. An apparatus, as in claim 1, including means to selectively energize said control means and said sensing means.

10. An apparatus, as in claim 1, wherein said alarm means may also be activated by means responsive to tampering with said vehicle occasioned in a manner other than changing the inclination of said vehicle.

* * * * *